United States Patent
Noda et al.

(10) Patent No.: US 12,101,262 B2
(45) Date of Patent: Sep. 24, 2024

(54) COMPUTER-READABLE RECORDING MEDIUM STORING DATA PROCESSING PROGRAM, DATA PROCESSING METHOD, AND DATA PROCESSING SYSTEM

(71) Applicant: FUJITSU LIMITED, Kawasaki (JP)

(72) Inventors: Masahide Noda, Kawasaki (JP); Tomoharu Imai, Kawasaki (JP); Zhaogong Guo, Koto (JP); Koichi Yokota, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 41 days.

(21) Appl. No.: 17/712,388

(22) Filed: Apr. 4, 2022

(65) Prior Publication Data

US 2022/0407821 A1    Dec. 22, 2022

(30) Foreign Application Priority Data

Jun. 17, 2021  (JP) .................... 2021-100932

(51) Int. Cl.
*H04L 47/83*  (2022.01)
*H04L 47/70*  (2022.01)
*H04L 47/726* (2022.01)
*H04L 47/762* (2022.01)

(52) U.S. Cl.
CPC ......... *H04L 47/83* (2022.05); *H04L 47/726* (2013.01); *H04L 47/762* (2013.01); *H04L 47/822* (2013.01)

(58) Field of Classification Search
CPC ..... H04L 47/83; H04L 47/726; H04L 47/762; H04L 47/822
See application file for complete search history.

(56) References Cited

U.S. PATENT DOCUMENTS

| | | | | |
|---|---|---|---|---|
| 6,466,980 B1* | 10/2002 | Lumelsky | ............ | G06F 9/5083 709/224 |
| 6,552,723 B1* | 4/2003 | Duluk, Jr. | ............ | G06T 15/40 345/419 |
| 10,601,732 B1* | 3/2020 | Peterson | ................ | H04L 47/32 |
| 11,360,804 B2* | 6/2022 | Sui | ........................ | G06F 9/5083 |
| 2011/0107166 A1* | 5/2011 | Flautner | ............ | G06F 11/1402 714/E11.023 |

(Continued)

FOREIGN PATENT DOCUMENTS

| | | |
|---|---|---|
| JP | 2001-67377 | 3/2001 |
| JP | 2017-219972 | 12/2017 |

*Primary Examiner* — Glenton B Burgess
*Assistant Examiner* — Jihad K Boustany
(74) *Attorney, Agent, or Firm* — STAAS & HALSEY LLP

(57) ABSTRACT

A data processing program causes a processing device, among a plurality of processing devices each executes predetermined processing on received data and outputs a result, to execute a process. The process includes, calculating, in a case where a notification that a resource is increased is received from a first processing device in a group of processing devices at a previous stage of the processing device among the plurality of processing devices, a ratio of an amount of data received from the first processing device to a total amount of data received from each of the group of processing devices, based on an amount of data received from each of the group of processing devices within a predetermined period, and determining whether or not to increase a resource of the processing device based on the calculated ratio and resource usage of the processing device.

7 Claims, 14 Drawing Sheets

(56) References Cited

U.S. PATENT DOCUMENTS

| | | | |
|---|---|---|---|
| 2015/0081470 A1* | 3/2015 | Westphal | G06Q 30/0631 |
| | | | 705/26.7 |
| 2017/0324677 A1* | 11/2017 | Berland | H04L 67/02 |
| 2017/0353541 A1 | 12/2017 | Higashi | |
| 2018/0096323 A1* | 4/2018 | Baber | G06Q 20/4012 |
| 2018/0225158 A1* | 8/2018 | Guigui | G06F 9/542 |
| 2020/0142741 A1* | 5/2020 | Xu | G06F 9/505 |
| 2021/0255899 A1* | 8/2021 | Chen | G06N 3/04 |
| 2021/0312336 A1* | 10/2021 | Sinn | G06N 3/084 |

* cited by examiner

FIG. 8

|  | TRANSMISSION SOURCE IP | RECEIVED AMOUNT [MB] |
|---|---|---|
| 800-1 | 10.244.1.12 | 10 |
| 800-2 | 10.244.1.13 | 20 |

800

COMPUTER-READABLE RECORDING MEDIUM STORING DATA PROCESSING PROGRAM, DATA PROCESSING METHOD, AND DATA PROCESSING SYSTEM

CROSS-REFERENCE TO RELATED APPLICATION

This application is based upon and claims the benefit of priority of the prior Japanese Patent Application No. 2021-100932, filed on Jun. 17, 2021, the entire contents of which are incorporated herein by reference.

FIELD

The embodiment discussed herein is related to a non-transitory computer-readable recording medium storing a data processing program, a data processing method, and a data processing system.

BACKGROUND

In recent years, there is a digital twin system that grasps and analyzes a virtual world as data by converting a real world into data and mapping the real world to the virtual world. In a digital twin system, for example, by capturing sensor data as time-series data, it is possible to analyze data that changes with the passage of time. On the other hand, in a case where a resource is insufficient due to an increase in the amount of data or the like, the processing amount of the entire service is increased by increasing the resource.

As a related art, there is a computer system capable of changing the number of processing nodes that execute a plurality of processing in a load-distributed manner, the computer system causing a processing program for executing second processing related to first processing to be transferred to a processing node that is increased to execute the second processing when a load of the first processing exceeds a first condition. There is a technique that dynamically predicts demand based on past demand, an input area, cost requirements, and the like, and adjusts the capacity accordingly in order to match the capacity of an object over a server with predicted expected capacity.

Japanese Laid-open Patent Publication No. 2017-219972 and Japanese Laid-open Patent Publication No. 2001-067377 are disclosed as related art.

SUMMARY

According to an aspect of the embodiments, a computer-readable recording medium storing a data processing program for causing a processing device, among a plurality of processing devices each executes predetermined processing on received data and outputs a result, to execute a process including: calculating, in a case where a notification that a resource is increased is received from a first processing device in a group of processing devices at a previous stage of the processing device among the plurality of processing devices, a ratio of an amount of data received from the first processing device to a total amount of data received from each of the group of processing devices, based on an amount of data received from each of the group of processing devices within a predetermined period; and determining whether or not to increase a resource of the processing device based on the calculated ratio and resource usage of the processing device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is an explanatory diagram illustrating an example of contents stored in a communication status table;

DESCRIPTION OF EMBODIMENTS

In the related art, in a system that performs stream data processing or the like by combining a plurality of services, it is difficult to determine an appropriate timing for increasing the resource of a processing device (node) in a system.

According to one embodiment, an object of the present embodiment is to determine an appropriate timing for increasing the resource of a processing device.

Hereinafter, an embodiment of a data processing program, a data processing method, and a data processing system according to the present disclosure is described in detail with reference to the drawings.

Figure 1:
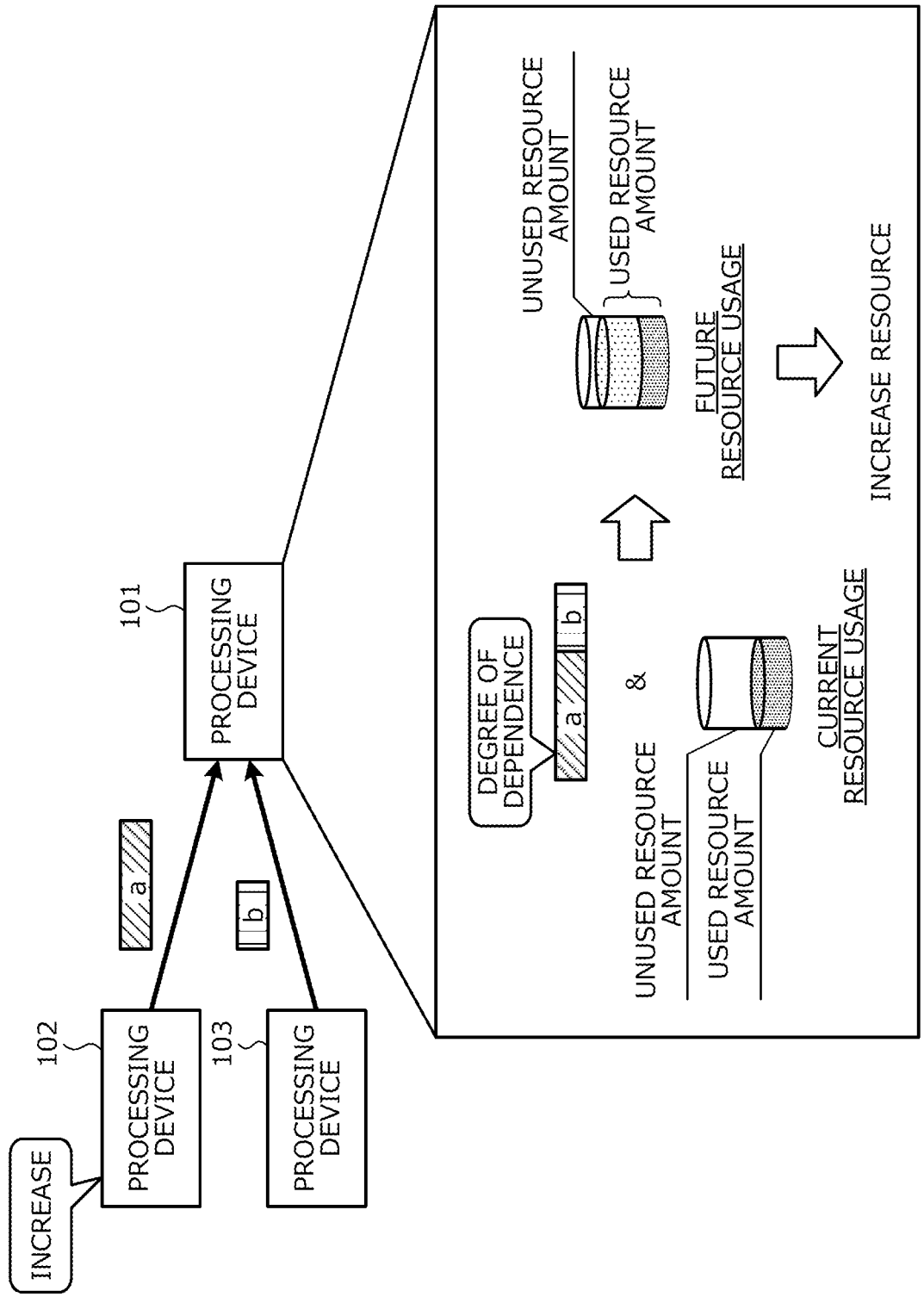
FIG. 1 is an explanatory diagram illustrating an example of a data processing method according to an embodiment.

FIG. 1 is an explanatory diagram illustrating an example of a data processing method according to an embodiment. As illustrated in FIG. 1, a processing device 101 is a computer that executes predetermined processing on received data and outputs a result. The predetermined processing is, for example, stream data processing. Stream data processing is the sequential processing of data that occurs from moment to moment. The data is, for example, sensor data of a vehicle (connected car), a production facility, or the like.

For example, in a digital twin system, information is taken from a sensor or the like deployed in a real world, and related data is combined, processed, and analyzed. In the digital twin system, by capturing the sensor data as time-series data, it is possible to analyze the data that changes with the passage of time.

In order to process a large amount of data at high speed, the data may be processed as stream data in parallel distribution and in a plurality of stages. For example, there is a digital twin system that performs stream data processing by combining a message queue service and a stream data processing service. In this digital twin system, sensor data is treated as stream data, and stream data processing is performed via a message queue.

In such a system, in a case where a resource is insufficient due to an increase in the amount of data or the like, the resource is increased by, for example, scale-out, scale-up, and the like.

As a service enhancement method realized by combining a plurality of services, for example, there is a technique in which each of the combined services individually controls the increase of a resource (Related Art 1). In Related Art 1, for example, each service increases a resource when the used resource of the service exceeds a predetermined threshold.

However, Related Art 1 has a problem that in a case where a certain service is enhanced, a service at the subsequent stage to which the stream data from the service flows immediately becomes short of a resource, and the resource shortage state continues for a long time.

There is a technique that collectively controls the increase of the resource for the entire combined services (Related Art 2). In Related Art 2, for example, if the used resource of the entire combined services exceeds a predetermined threshold, the resource of all the services is collectively increased.

However, in Related Art 2, there is a case where a service that does not have to be enhanced may be reinforced, leading to excessive resource provision.

Further, there is a technique (Related Art 3) in which, when a service at the previous stage continues to exceed a predetermined load amount for a predetermined time, a service at the subsequent stage is enhanced. According to Related Art 3, ranges of thresholds related to time and a load amount and a link between each service and a service at the previous stage are set in advance. For example, Japanese Laid-open Patent Publication No. 2017-219972 may be referred to for Related Art 3.

However, since the situation in the real world changes from hour to hour, the flow rate from a sensor to a message queue also changes depending on the situation. As a result, the inflow amount from the service at the previous stage changes depending on the situation. For this reason, it is difficult to set parameters such as a range of thresholds in advance as in Related Art 3. In a system configuration in which a plurality of message queues are used and stream data processing is coupled at a plurality of stages, complexity of the coupling relationship between services increases, and it becomes difficult to set parameters in advance.

In the present embodiment, a data processing method will be described in which, when the resource of a certain processing device is increased, an appropriate timing for increasing the resource of a processing device at the subsequent stage is determined. An example of processing performed by the processing device 101 illustrated in FIG. 1 is described below. Here, the processing device 101 is any processing device among a plurality of processing devices, executes predetermined processing on data received from processing devices at the previous stage, and outputs a result. The processing devices at the previous stage of the processing device 101 are referred to as "processing devices 102 and 103".

(1) The processing device 101 receives an increase notification from a first processing device in the processing device group at the previous stage of the processing device 101. The increase notification is a notification indicating that a resource has been increased. Increasing the resource of a processing device tends to improve the processing capacity of the processing device and increase the amount of data flowing from the processing device to a processing device at the subsequent stage.

In the example illustrated in FIG. 1, it is assumed that the processing device 101 receives an increase notification from a processing device 102 at the previous stage.

(2) When receiving an increase notification from the first processing device 102, the processing device 101 calculates a ratio of an amount of data received from the first processing device to the total amount of data received from each of the processing device group at the previous stage based on the amount of data received from each of the processing device group at the previous stage within a predetermined period. The predetermined period may be arbitrarily set, and is, for example, a period of a certain time (30 minutes or the like) including a time point at which the increase notification is received.

There is a relationship in which, as the amount of data received increases, the processing load of the processing device 101 increases accordingly. Accordingly, it may be said that a processing device having a larger amount of data received by the processing device 101 among the processing device group at the previous stage has a higher degree of dependence on the relationship with the processing device 101.

The degree of dependence of the processing device 101 on the first processing device is represented by the ratio of the amount of data received from the first processing device to the total amount of data received by each of the processing device group at the previous stage. Based on the degree of dependence on the first processing device, the processing device 101 may estimate how the enhancement of the first processing device affects the processing device 101.

In the example illustrated in FIG. 1, in response to reception of an increase notification from the processing device 102 at the previous stage, the processing device 101 identifies the amount of data received in the latest 30 minutes from each of the processing device group 102 and 103 at the previous stage. Here, the amount of data received from the processing device 102 in the latest 30 minutes is referred to as a "received amount a", and the amount of data received from the processing device 103 in the latest 30 minutes is referred to as a "received amount b" (a>b). In this case, the processing device 101 calculates a ratio "a/(a+b)" of the received amount "a" of the processing device 102 at the previous stage to the total "a+b" of the received amounts of each of the processing device group 102 and 103 at the previous stage. The ratio "a/(a+b)" represents the degree of dependence of the processing device 101 on the processing device 102 at the previous stage.

(3) The processing device 101 determines whether or not to increase the resource of the processing device 101 based on the calculated ratio and the resource usage of the processing device 101. The resource usage is represented by, for example, a used resource amount and an unused resource amount. It may be said that the higher the degree of dependence of the processing device 101 on the first processing device, the larger the influence of the enhancement of the first processing device on the processing device 101, and it may be assumed that the amount of data received increases due to the enhancement of the first processing device and the resource consumption increases.

For this reason, when the first processing device is enhanced, the processing device 101 determines that the unused resource of the processing device 101 is used in accordance with the degree of dependence on the first processing device. For example, the processing device 101 estimates the future resource usage of the processing device 101 based on the calculated ratio and the current resource usage of the processing device 101. For example, the future resource usage is estimated such that the used resource amount of the processing device 101 increases as the calculated ratio increases.

The processing device 101 determines whether or not the estimated future resource usage satisfies a predetermined increase condition. In a case where the increase condition is satisfied, the processing device 101 determines that the resource of the processing device 101 is to be increased. On the other hand, in a case where the increase condition is not satisfied, the processing device 101 determines that the resource of the processing device 101 is not to be increased.

In the example illustrated in FIG. 1, the processing device 101 estimates future resource usage based on the calculated ratio "a/(a+b)" and the current resource usage of the processing device 101. The processing device 101 determines whether or not the estimated future resource usage satisfies the predetermined increase condition. It is assumed that the future resource usage satisfies the increase condition. In this case, the processing device 101 determines that the resource of the processing device 101 is to be increased.

As described above, according to the processing device 101, it is possible to calculate the degree of increased dependence on the first processing device based on the amount of network communication (the received amount of each of the processing device group at the previous stage). According to the processing device 101, it is possible to estimate how the enhancement of the first processing device affects the processing device 101 based on the degree of dependence on the first processing device to determine whether or not the resource becomes insufficient.

Accordingly, even in a case where it is difficult to directly predict a change in the amount of network communication or a change in the resource consumption due to the enhancement of the processing device 102 at the previous stage, the processing device 101 may determine an appropriate timing at which the resource of the processing device 101 is to be increased. In the example illustrated in FIG. 1, the processing device 101 may estimate how the enhancement of the processing device 102 at the previous stage affects the processing device 101 based on the degree of dependence on the processing device 102 at the previous stage to determine whether or not to increase the resource of the processing device 101 in conjunction with the enhancement of the processing device 102 at the previous stage.

(Example of System Configuration of Data Processing System 200)

First, an example of a system configuration of a data processing system 200 according to the embodiment will be described. For example, the data processing system 200 is applied to a digital twin system that collects data of the real world (humans and things) over a cloud and provides a result of analysis and prediction of the data to a service or an application. For example, in the case of a connected car, it is possible to analyze a large amount of data collected from a vehicle such as speed and position and to feed risk information or the like back to the driver of the vehicle.

Hereinafter, a plurality of processing devices included in the data processing system 200 may be referred to as "nodes N1 to Nn" (n: natural number of 2 or more). Arbitrary node among the nodes N1 to Nn may be referred to as a "node Ni" (i=1, 2, ..., n). The processing device 101 illustrated in FIG. 1 corresponds to the node Ni, for example.

Figure 2:
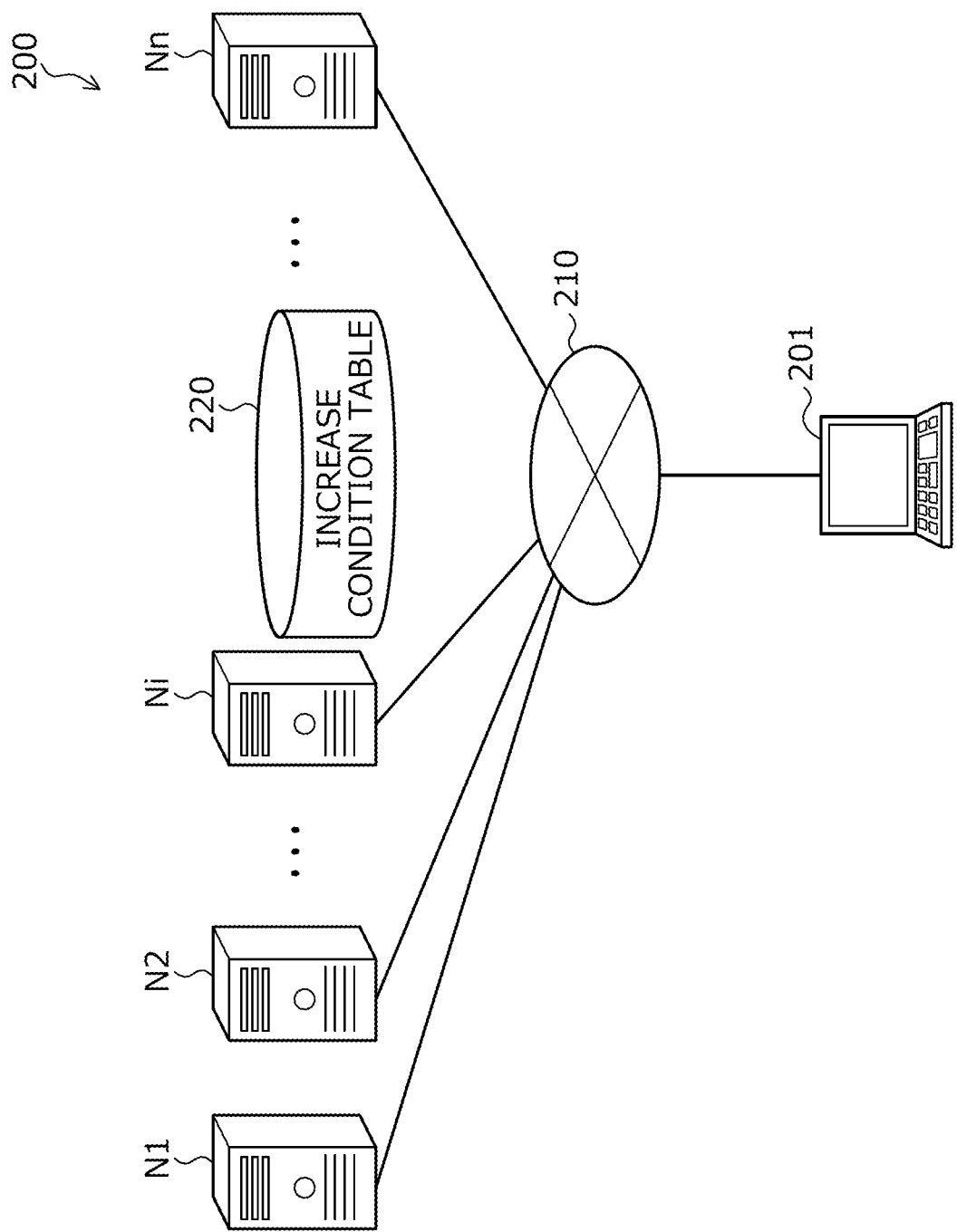
FIG. 2 is an explanatory diagram illustrating an example of a system configuration of a data processing system.

FIG. 2 is an explanatory diagram illustrating an example of a system configuration of the data processing system 200. As illustrated in FIG. 2, the data processing system 200 includes nodes N1 to Nn and a management terminal 201. In the data processing system 200, the nodes N1 to Nn and the management terminal 201 are coupled to each other via a wired or wireless network 210. The network 210 is, for example, the Internet, a local area network (LAN), a wide area network (WAN), or the like.

The node Ni includes an increase condition table 220, executes predetermined processing on received data, and outputs a result. For example, the node Ni is a data processing platform corresponding to a service such as a message queue service or a stream data processing service. Examples of the predetermined processing include sensor data queuing processing, stream data processing, and the like.

For example, the node Ni may be a cloud computing server or an edge computing server. The node Ni may be realized by a virtual machine or a container over a server (physical server). The contents stored in the increase condition table 220 will be described below with reference to FIG. 4.

The management terminal 201 is a computer used by an administrator of the data processing system 200. For example, the management terminal 201 is a personal computer (PC), a tablet PC, or the like.

For example, in the data processing system 200, the node Ni executes predetermined processing (for example, queuing processing and stream data processing) on data received from a node at the previous stage and outputs a result to a node at the subsequent stage. The node Ni may identify a node at the previous stage of the node Ni and a node at the subsequent stage of the node Ni. For example, the nodes at the previous stage and the subsequent stage of the node Ni may be set by an administrator. As for the node at the previous stage, the node Ni may identify a node that has transmitted data to the node Ni as the node at the previous stage.

(Example of Hardware Configuration of Node Ni)

Figure 3:
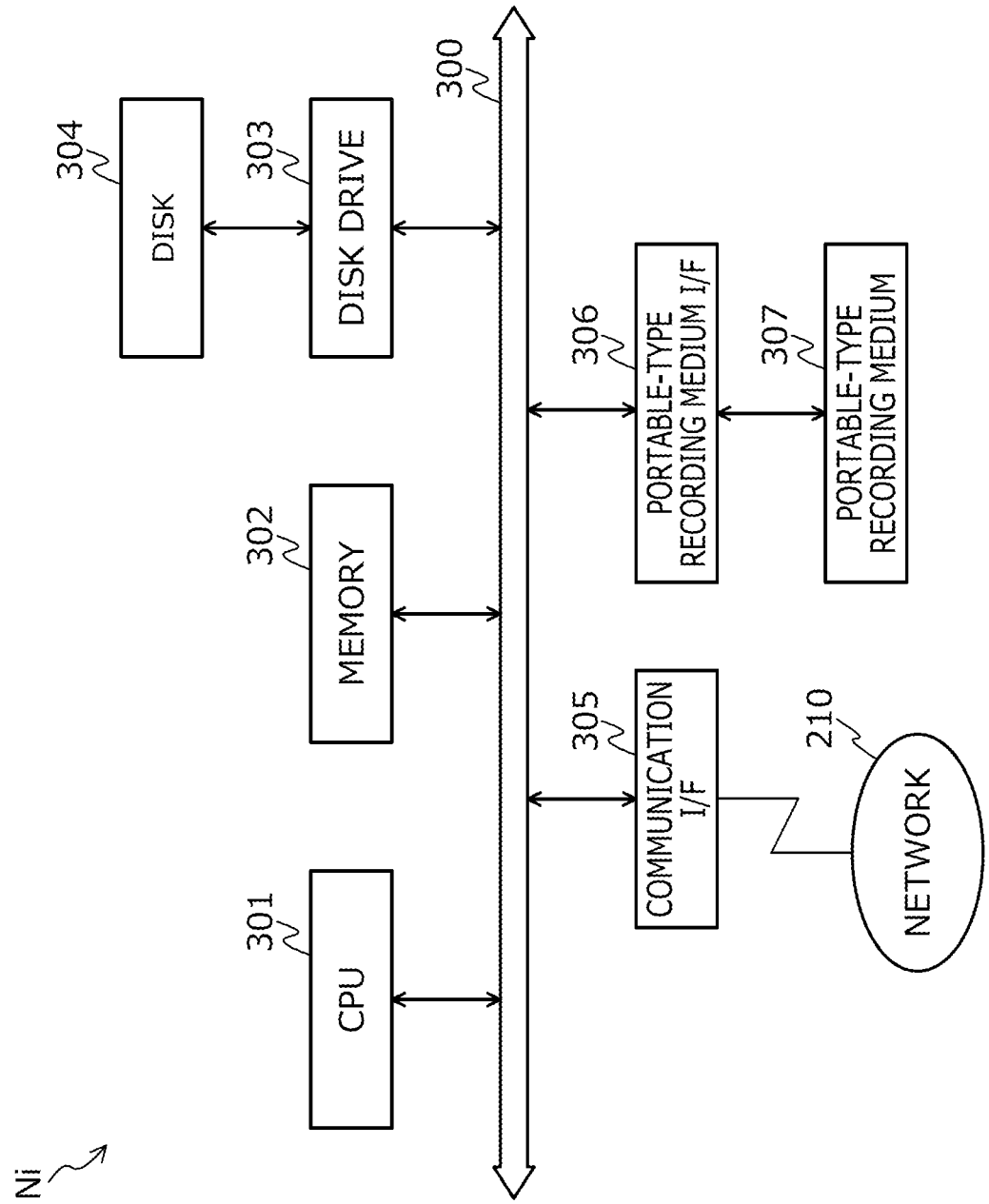
FIG. 3 is a block diagram illustrating an example of a hardware configuration of a node.

FIG. 3 is a block diagram illustrating an example of a hardware configuration of the node Ni. As illustrated in FIG. 3, the node Ni includes a central processing unit (CPU) 301, a memory 302, a disk drive 303, a disk 304, a communication interface (I/F) 305, a portable-type recording medium I/F 306, and a portable-type recording medium 307. The respective components are coupled to one another through a bus 300.

The CPU 301 controls the entire node Ni. The CPU 301 may have a plurality of cores. The memory 302 includes, for example, a read-only memory (ROM), a random-access memory (RAM), a flash ROM, and the like. For example, the flash ROM stores a program of an operating system (OS), the ROM stores application programs, and the RAM is used as a work area for the CPU 301. The programs stored in the memory 302 are loaded by the CPU 301, thereby causing the CPU 301 to execute coded processing.

The disk drive 303 controls reading and writing of data from and to the disk 304 in accordance with the control of the CPU 301. The disk 304 stores data written under the control of the disk drive 303. Examples of the disk 304 include a magnetic disk, an optical disk, and the like.

The communication I/F 305 is coupled to the network 210 through a communication line and is coupled to another computer through the network 210. The communication I/F 305 functions as an interface between the network 210 and the inside of the device to control input and output of data from and to the other computer. As the communication I/F 305, for example, a modem, a LAN adapter, or the like may be used.

The portable-type recording medium I/F 306 controls reading and writing of data from and to the portable-type recording medium 307 in accordance with the control of the CPU 301. The portable-type recording medium 307 stores data written under the control of the portable-type recording medium I/F 306. Examples of the portable-type recording medium 307 include a compact disk (CD)-ROM, a Digital Versatile Disk (DVD), a Universal Serial Bus (USB) memory, and the like.

Each of the nodes Ni may include, for example, an input device, a display, and the like, as well as the above-described constituent units. A hardware configuration of the management terminal 201 illustrated in FIG. 2 may be realized by the same hardware configuration as those of the node Ni. However, the management terminal 201 includes, for example, an input device, a display, and the like, as well as the above-described constituent units.

(Contents Stored in Increase Condition Table 220)

The contents stored in the increase condition table 220 of the node Ni will be described with reference to FIG. 4. For example, the increase condition table 220 is realized by a storage device such as the memory 302 or the disk 304 illustrated in FIG. 3.

Figure 4:
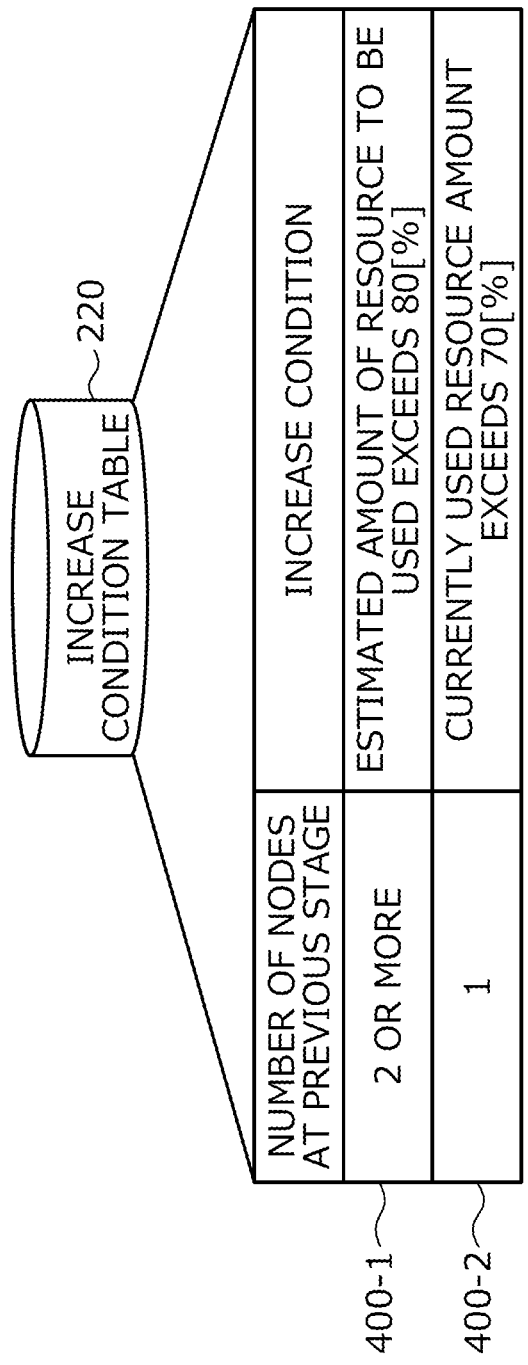
FIG. 4 is an explanatory diagram illustrating an example of contents stored in an increase condition table.

FIG. 4 is an explanatory diagram illustrating an example of contents stored in the increase condition table 220. As illustrated in FIG. 4, the increase condition table 220 stores increase condition information 400-1 and 400-2. The increase condition information 400-1 indicates an increase condition "estimated amount of resource to be used exceeds 80[%]" in a case where the number of nodes at the previous stage is 2 or more. The increase condition information 400-2 indicates an increase condition "currently used resource amount exceeds 70[%]" in a case where the number of nodes at the previous stage is 1. Each of the increase conditions may be freely set for each node Ni, for example.

(Example of Coupling Between Nodes in Data Processing System 200)

An example of coupling between nodes in the data processing system 200 will be described with reference to FIG. 5.

Figure 5:
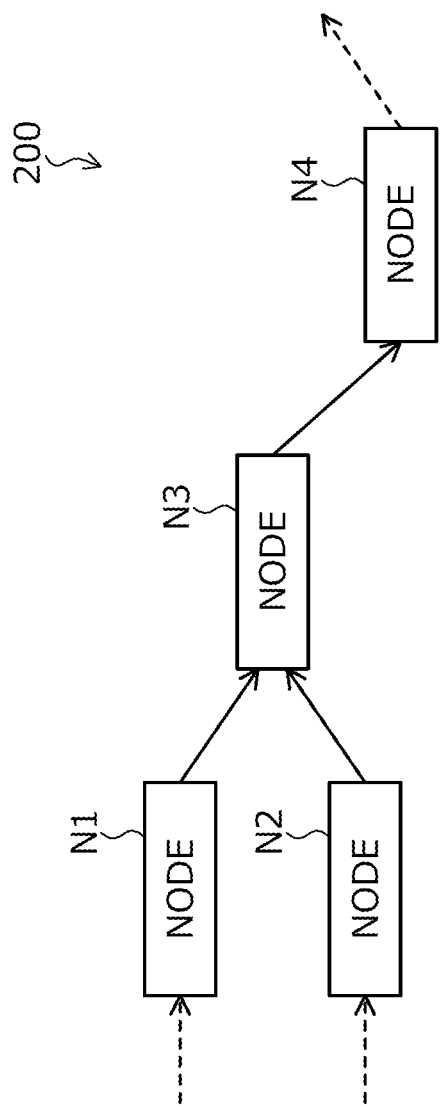
FIG. 5 is an explanatory diagram illustrating an example of coupling between nodes in the data processing system.

FIG. 5 is an explanatory diagram illustrating an example of coupling between nodes in the data processing system 200. FIG. 5 illustrates nodes N1 to N4 in the data processing system 200. Each of the nodes N1 and N2 is a node at the previous stage of the node N3. For example, each of the nodes N1 and N2 executes queuing processing and the like on the data received from a node, a sensor (for example, a connected car), and the like at the previous stage (not illustrated) and output a result to the node N3 at the subsequent stage.

The node N3 is a node at the subsequent stage of the nodes Ni and N2, and is a node at the previous stage of the node N4. For example, the node N3 executes stream data processing or the like on the data received from the nodes N1 and N2 at the previous stage and outputs a result to the node N4 at the subsequent stage.

The node N4 is a node at the subsequent stage of the node N3. For example, the node N4 executes stream data processing or the like on the data received from the node N3 at the previous stage, and outputs a result to a node (not illustrated) or a user terminal (for example, an application, a service, or the like) at the subsequent stage.

(Example of Functional Configuration of Node Ni)

Figure 6:
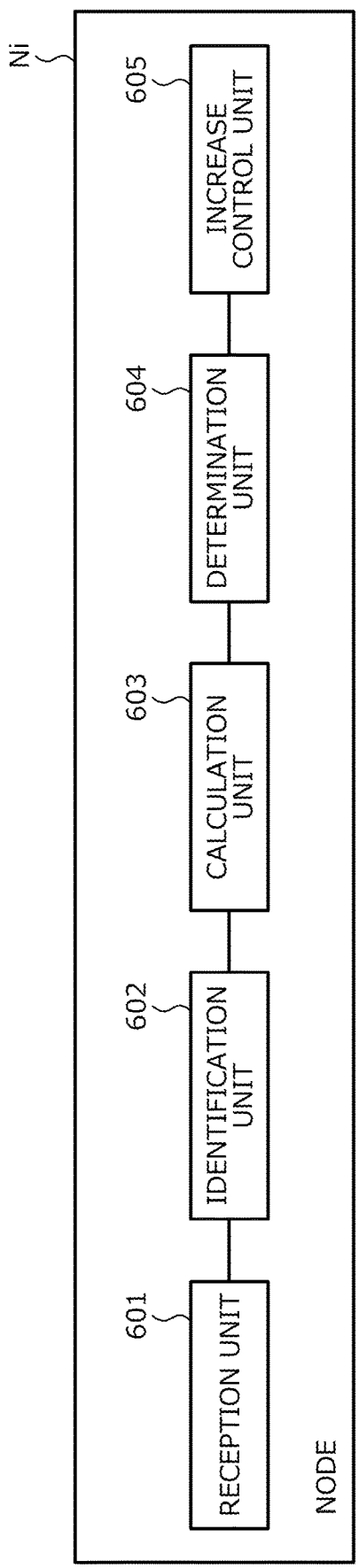
FIG. 6 is a block diagram illustrating an example of a functional configuration of the node.

FIG. 6 is a block diagram illustrating an example of a functional configuration of the node Ni. As illustrated in FIG. 6, the node Ni includes a reception unit 601, an identification unit 602, a calculation unit 603, a determination unit 604, and an increase control unit 605. The reception unit 601 to the increase control unit 605 are functions constituting a control unit. For example, the functions are realized by causing the CPU 301 to execute a program stored in a storage device such as the memory 302, the disk 304, or the portable-type recording medium 307 illustrated in FIG. 3 or by using the communication I/F 305. The processing result obtained by each of the functional units is stored, for example, in a storage device such as the memory 302 or the disk 304.

The reception unit 601 receives an increase notification from a node Nj (j≠i, j=1, 2, ..., n) at the previous stage of the node Ni among the nodes N1 to Nn. The increase notification is a notification indicating that the resource has been increased. An identifier for identifying the node Nj at the previous stage, for example, an Internet Protocol (IP) address is included in the increase notification.

For example, in response to the fact that the resource of the node Nj at the previous stage is increased by scale-out, scale-up, or the like, the node Ni is notified of the increase notification from the node Nj at the previous stage. For example, the increase notification may be notified at a timing at which the increase is completed, or may be notified at a timing at which the increase is started in the node Nj at the previous stage. For example, the resource in the node Nj at the previous stage may be increased in a case where it is determined that the resource is to be increased by the determination unit 604 of the node Nj at the previous stage, or may be increased by an instruction of the administrator or existing resource control.

Upon receiving the increase notification from the node Nj at the previous stage, the identification unit 602 identifies the amount of data received within a predetermined period T from each of the node group at the previous stages of the node Ni. The predetermined period T is a period provided for determining the latest communication status, and is set to, for example, a period of about the latest 30 minutes before the time point at which the increase notification is received. The node group at the previous stage include one or more nodes including the node Nj at the previous stage.

For example, the identification unit 602 acquires, from an operating system (OS) of the node Ni, the amount of data received per unit time collected by the service as a metric. The amount of data received may be represented by, for example, a byte size (number of bytes) or the number of messages.

Figure 7:
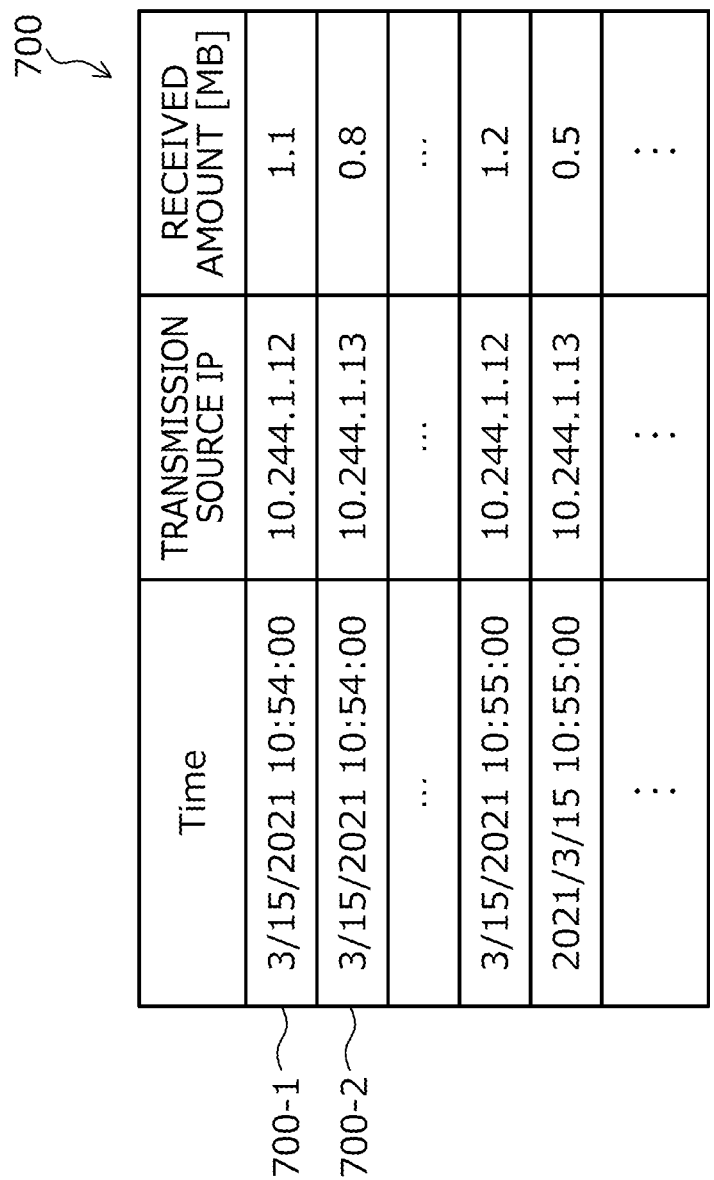
FIG. 7 is an explanatory diagram illustrating an example of contents stored in a received amount collection table.

For example, the acquired amount of data received per unit time is stored in a received amount collection table 700 as illustrated in FIG. 7. For example, the received amount collection table 700 is realized by a storage device such as the memory 302 or the disk 304 illustrated in FIG. 3. The contents stored in the received amount collection table 700 will be described.

FIG. 7 is an explanatory diagram illustrating an example of the contents stored in the received amount collection table 700. As illustrated in FIG. 7, the received amount collection table 700 has fields of Time, transmission source IP, and received amount, and stores the amount of data received (for example, the amounts of data received 700-1 and 700-2) as a record by setting information in each field.

Here, Time indicates a time slot. For example, the time "3/15/2021 10:54:00" indicates a time slot (one minute) of about 10:54 on Mar. 15, 2021. The transmission source IP indicates an IP address of the node Nj at the previous stage. The received amount indicates an amount of data received per minute from the node Nj at the previous stage in Time (unit: MB).

Based on the acquired amount of data received per unit time, the identification unit 602 identifies the amount of data received within the predetermined period T from each of the node group at the previous stage. The predetermined time T is a period of the latest 30 minutes. In this case, the identification unit 602 refers to the received amount collection table 700 to extract the data of received amount in which Time is included in the latest 30 minutes for each of the node group at the previous stage. By totaling the received amount indicated by the extracted amount of data received for each of the node group at the previous stage, the identification unit 602 identifies the amount of data received in the latest 30 minutes.

The amount of data received within the identified predetermined period T (for example, the latest 30 minutes) is stored in the communication status table 800 as illustrated in FIG. 8, for example, in association with the node Nj at the previous stage. For example, the communication status table 800 is realized by a storage device such as the memory 302 or the disk 304 illustrated in FIG. 3. The contents stored in the communication status table 800 will be described.

FIG. 8 is an explanatory diagram illustrating an example of the contents stored in the communication status table 800. As illustrated in FIG. 8, the communication status table 800 has fields of transmission source IP and received amount, and stores communication status information (for example, communication status information 800-1 and 800-2) as a record by setting information in each field.

Here, the transmission source IP indicates the IP address of the node Nj at the previous stage. The received amount indicates the amount (unit: MB) of data received from the node Nj at the previous stage in the latest 30 minutes.

Returning to the description of FIG. 6, the calculation unit 603 calculates a ratio of the received amount of the node Nj at the previous stage to the total of received amount from each of the node group at the previous stage based on the amount of data received within the predetermined period T from each of the identified node group at the previous stage. For example, the calculation unit 603 refers to the communication status table 800 illustrated in FIG. 8 to calculate the ratio of the received amount of each of the node group at the previous stage.

The calculation unit 603 calculates a dependency ratio of the node Nj at the previous stage from the calculated ratio of the received amount of each of the node group at the previous stage. The dependency ratio of the node Nj at the previous stage is an index value indicating the degree of dependence of the node Ni on the node Nj at the previous stage, and indicates the strength in the relationship between the node Ni and the node Nj at the previous stage. The dependency ratio of the node Nj at the previous stage may be represented by, for example, a ratio of the received amount of the node Nj at the previous stage to the total of the received amount of each of the node group at the previous stage.

In the example illustrated in FIG. 8, the ratio between the received amount of a node having the transmission source IP "10.244.1.12" and the received amount of a node having the transmission source IP "10.244.1.13" is "1:2". For example, it is assumed that an increase notification is received from the node having the transmission source IP address "10.244.1.12" (the node Nj at the previous stage). In this case, the dependency ratio of the node Nj at the previous stage is "1/3".

Based on the calculated ratio and the resource usage of the node Ni, the determination unit 604 determines whether or not to increase the resource of the node Ni. Here, the resource usage includes, for example, a currently used resource amount and a currently unused resource amount. Examples of the resource include, for example, CPU, memory, storage, communication I/F, and so forth.

The currently used resource amount is an amount of the resource that is currently being used among the available resources of the node Ni (unit: [%]). The currently unused resource amount is an amount of the resource that is not currently used among the available resources of the node Ni (unit: [%]). For example, the resource usage may be acquired from the OS of the node Ni. For example, the available resources of the node Ni may be all the resources of the node Ni or may be some of the resources of the node Ni.

For example, the determination unit 604 acquires the currently used resource amount and unused resource amount from the OS of the node Ni. Thereafter, the determination unit 604 calculates estimated resource consumption based on the calculated dependency ratio of the node Nj at the previous stage and the currently used resource amount and unused resource amount.

The estimated resource consumption indicates a future use resource amount of the node Ni. For example, the determination unit 604 may calculate estimated resource consumption of the node Ni by using the following equation (1). R (used) indicates the currently used resource amount of the node Ni. R (not yet used) indicates the currently unused resource amount of the node Ni. dR indicates a dependency ratio of the node Nj at the previous stage.

$$\text{Estimated resource consumption} = R(\text{used}) + R(\text{not yet used}) * dR \quad (1)$$

Thereafter, the determination unit 604 determines whether or not the calculated estimated resource consumption satisfies the increase condition. For example, the determination unit 604 refers to the increase condition table 220 illustrated in FIG. 4 to identify the increase condition "estimated amount of resource to be used exceeds 80[%]" in a case where the number of nodes at the previous stage is 2 or more.

The determination unit 604 determines whether or not the calculated estimated resource consumption is larger than 80[%]. 80[%] corresponds to a threshold for determining whether or not the increase condition is satisfied. In a case where the estimated resource consumption is larger than 80[%], the determination unit 604 determines that the resource of the node Ni is to be increased. By contrast, in a case where the estimated resource consumption is equal to or less than 80[%], the determination unit 604 determines that the resource of the node Ni is not to be increased.

There may be a case where there is one node at the previous stage. In this case, the determination unit 604 refers to the increase condition table 220 to identify the increase condition" currently used resource amount exceeds 70[%]" in a case where the number of nodes at the previous stage is 1. The determination unit 604 determines whether or not the acquired currently used resource amount of the node Ni is larger than 70[%]. In a case where the currently used resource amount is larger than 70[%], the determination unit 604 determines that the resource of the node Ni is to be increased. By contrast, in a case where the currently used resource amount is equal to or less than 70[%], the determination unit 604 determines that the resource of the node Ni is not to be increased.

An example of determining whether or not to increase the resource of the node Ni will be described later with reference to FIGS. 9 to 11.

For example, the determination unit 604 may use machine learning using regression analysis, a neural network, or the like to determine whether or not to increase the resource of the node Ni. An example of processing in a case where it is determined whether or not to increase the resource of the node Ni by using machine learning will be described later with reference to FIG. 13.

In a case where it is determined to increase the resource of the node Ni, the increase control unit 605 increases the resource of the node Ni. For example, in a case where it is determined that the resource of the node Ni is to be increased, the increase control unit 605 may increase the amount of the resource to be allocated to execute the predetermined processing (queuing processing, stream data processing, or the like).

The increase in the amount of the resource may be predetermined, for example. The increase in the amount of the resource may be determined in accordance with a difference between the estimated resource consumption and a threshold (for example, 80[%]). In a case where there is one node at the previous stage, the increase in the amount of the resource may be determined in accordance with a difference between the current resource amount and a threshold (for example, 70[%]).

For example, it is assumed that the node Ni is realized by a virtual machine or a container. The resource to be increased is referred to as a "CPU resource". In this case, for example, the increase control unit 605 may increase the number of virtual CPUs (CPU resource) to be allocated to the node Ni by a predetermined number.

For example, in a case where it is determined that the resource of the node Ni is to be increased, the increase control unit 605 may output an instruction for increasing the resource of the node Ni to the management terminal 201 illustrated in FIG. 2 or a resource control device (not illustrated). For example, the IP address of the node Ni or information on the resource to be increased (the type of the resource, an increase in the amount of the resource, and the like) is included in the instruction to increase the resource.

For example, the administrator or a resource control device (not illustrated) of the data processing system 200 may increase the resource of the node Ni in response to an increase instruction from the node Ni. Accordingly, when the resource of the node Nj at the previous stage is increased, it is possible to increase the resource of the node Ni before the resource of the node Ni at the subsequent stage becomes insufficient.

For example, the processing of the determination unit 604 and the increase control unit 605 may be executed for each type (CPU, memory, storage, communication I/F, and the like) of resource of the node Ni. For example, the processing of the determination unit 604 and the increase control unit 605 may be executed only for a specific type of resource (for example, a CPU) of the node Ni.

After increasing the resource of the node Ni, for example, in a case where the used resource amount of the node Ni decreases to a predetermined amount or less due to a decrease in the inflow amount of data from the node group at the previous stage or the like, the increase control unit 605 may release a part of the resource of the node Ni.

(Example of Determination of Increasing Resource)

An example of determining whether or not to increase the resource of the node Ni will be described with reference to FIGS. 9 to 11. The data processing system 200 illustrated in FIG. 5 will be described as an example. The node Ni is referred to as a "node N3", and the node group at the previous stage is referred to as the "nodes N1 and N2".

Figure 9:
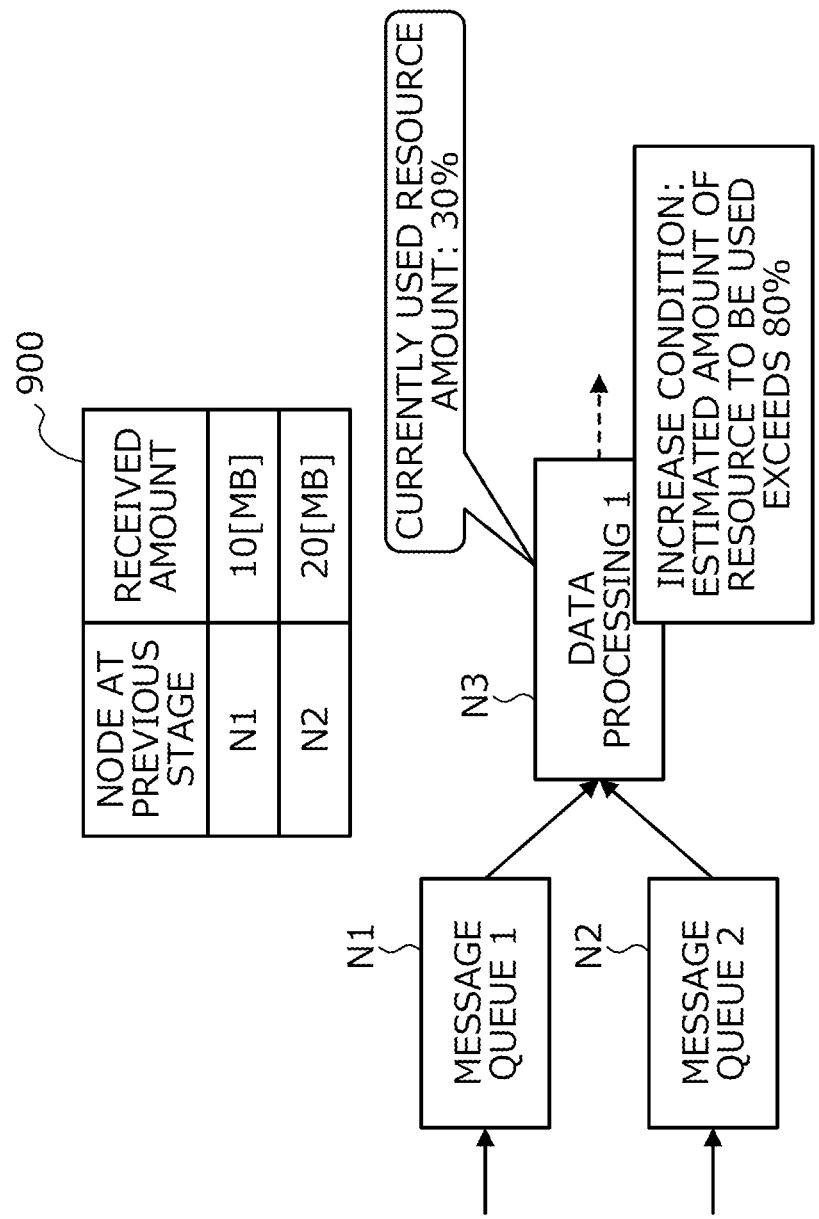
FIG. 9 is an explanatory diagram (part 1) illustrating an example of determining whether to increase a resource.

FIG. 9 is an explanatory diagram (part 1) illustrating an example of determination of increasing a resource. FIG. 9 illustrates the node N3 and the node group N1 and N2 at the previous stage of the node N3. The node N1 executes a service in a message queue 1. The node N2 executes a service in a message queue 2. The node N3 executes a service of data processing 1.

For example, the services in the message queues 1 and 2 buffer the received sensor data and sequentially output the sensor data to the node N3 at the subsequent stage. The service of data processing 1 executes stream data processing on the data received from each of the node group N1 and N2 at the previous stage, and outputs a result to a node at the subsequent stage (for example, the node N4 illustrated in FIG. 5).

The communication status table 900 indicates the amount of data received for the latest 30 minutes from each of the node group N1 and N2 at the previous stage. As identifiers of the nodes N1 and N2 in FIGS. 9 to 11, "N1 and N2" are written instead of "transmission source IP" of the nodes N1 and N2.

The received amount from the node N1 of the node N3 is "10 [MB]". The received amount of the node N3 from the node N2 is "20 [MB]". In this case, for example, the node N3 calculates a dependency ratio of each of the nodes N1 and N2 at the previous stage from the ratio of the received amount of each of the node group N1 and N2 at the previous stage.

The dependency ratio of the node N1 at the previous stage is "1/3". The dependency ratio of the node N2 at the previous stage is "2/3". It is assumed that the currently used resource amount of the node N3 is "30[%]", and the currently unused resource amount of the node N3 is "70[%]". For the node N3, the increase condition in a case where the number of nodes at the previous stage is 2 or more is set to "estimated amount of resource to be used exceeds 80[%]".

First, it is assumed that the resource of the node N1 among the node group N1 and N2 at the previous stage is increased. In this case, the node N3 uses the above equation (1) to calculate the estimated resource consumption of the node N3 from the dependency ratio of the node N1 at the previous stage and the currently used resource amount and unused resource amount of the node N3. The estimated resource consumption is as follows.

$$\text{Estimated resource consumption} = 30 + 70*(1/3) = 53.3\ [\%]$$

Because the calculated estimated resource consumption is equal to or less than 80[%], the node N3 determines that the resource of the node N3 is not to be increased in conjunction with the node N1 at the previous stage.

A case where the resource of the node N2 among the node group N1 and N2 at the previous stage has been increased is assumed. In this case, the node N3 uses the above equation (1) to calculate the estimated resource consumption of the node N3 from the dependency ratio of the node N2 at the previous stage and the currently used resource amount and unused resource amount of the node N3. The estimated resource consumption is as follows.

Estimated resource consumption=30+70*(2/3)=76.6 [%]

Because the calculated estimated resource consumption is equal to or less than 80[%], the node N3 determines that the resource of the node N3 is not to be increased in conjunction with the node N2 at the previous stage.

Figure 10:
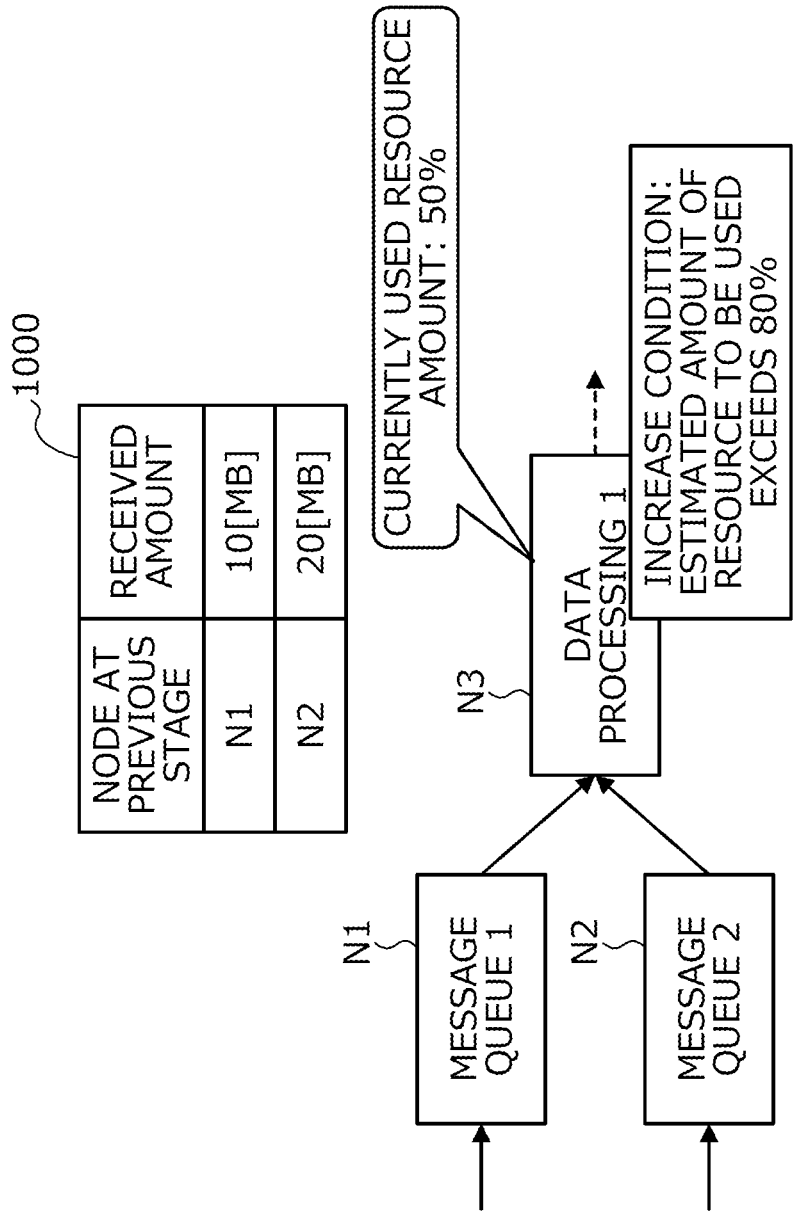
FIG. 10 is an explanatory diagram (part 2) illustrating an example of determining whether to increase the resource.

FIG. 10 is an explanatory diagram (part 2) illustrating an example of determining whether to increase the resource. FIG. 10 illustrates the node N3 and the node group N1 and N2 at the previous stage of the node N3. The communication status table 1000 indicates the amount of data received for the latest 30 minutes from each of the node group N1 and N2 at the previous stage.

The received amount from the node N1 of the node N3 is "10 [MB]". The received amount of the node N3 from the node N2 is "20 [MB]". In this case, for example, the node N3 calculates a dependency ratio of each of the nodes N1 and N2 at the previous stage from the ratio of the received amount of each of the node group N1 and N2 at the previous stage.

The dependency ratio of the node N1 at the previous stage is "1/3". The dependency ratio of the node N2 at the previous stage is "2/3". It is assumed that the currently used resource amount of the node N3 is "50[%]", and the currently unused resource amount of the node N3 is "50[%]". For the node N3, the increase condition in a case where the number of nodes at the previous stage is 2 or more is set to "estimated amount of resource to be used exceeds 80[%]".

First, it is assumed that the resource of the node N1 among the node group N1 and N2 at the previous stage is increased. In this case, the node N3 uses the above equation (1) to calculate the estimated resource consumption of the node N3 from the dependency ratio of the node N1 at the previous stage and the currently used resource amount and unused resource amount of the node N3. The estimated resource consumption is as follows.

Estimated resource consumption=50+50*(1/3)=66.6 [%]

Because the calculated estimated resource consumption is equal to or less than 80[%], the node N3 determines that the resource of the node N3 is not to be increased in conjunction with the node N1 at the previous stage.

A case where the resource of the node N2 among the node group N1 and N2 at the previous stage has been increased is assumed. In this case, the node N3 uses the above equation (1) to calculate the estimated resource consumption of the node N3 from the dependency ratio of the node N2 at the previous stage and the currently used resource amount and unused resource amount of the node N3. The estimated resource consumption is as follows.

Estimated resource consumption=50+50*(2/3)=83.3 [%]

Because the calculated estimated resource consumption exceeds 80[%], the node N3 determines that the resource of the node N3 is to be increased in conjunction with the node N2 at the previous stage.

Figure 11:
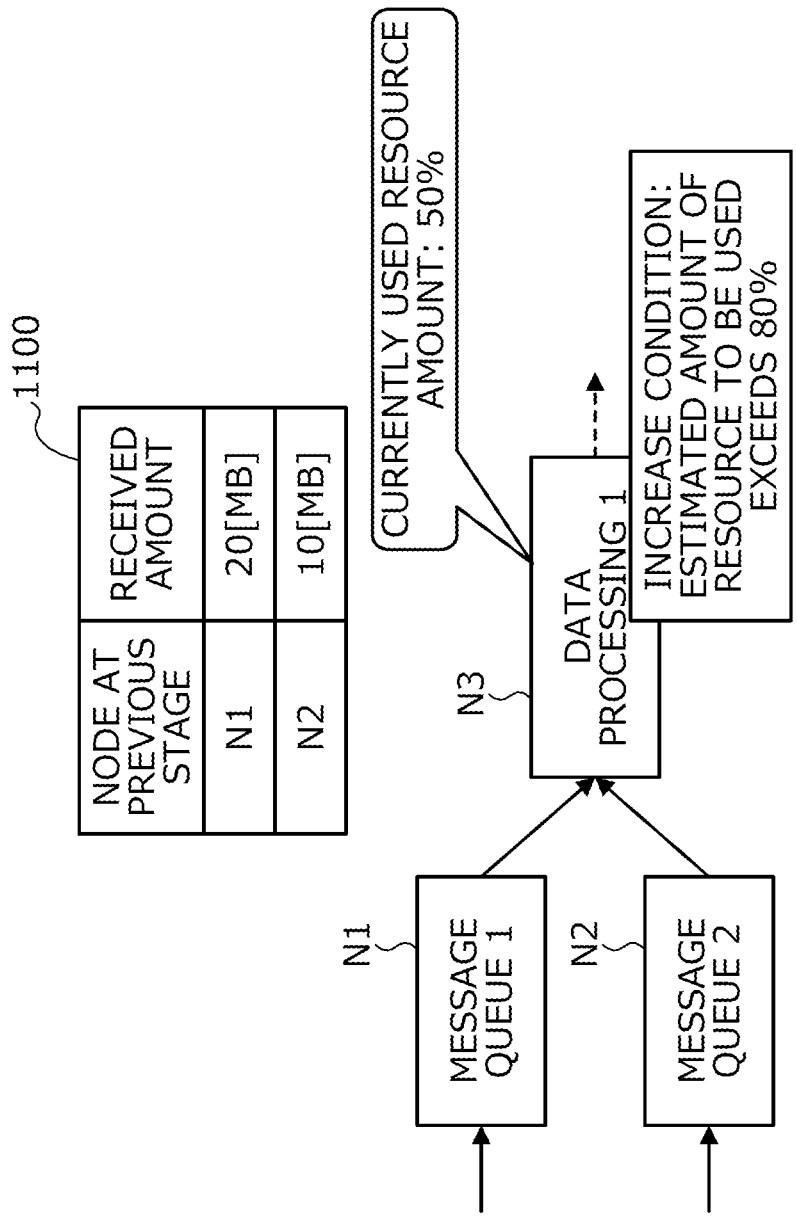
FIG. 11 is an explanatory diagram (part 3) illustrating an example of determining whether to increase the resource.

FIG. 11 is an explanatory diagram (part 3) illustrating an example of determining whether to increase the resource. FIG. 11 illustrates the node N3 and the node group N1 and N2 at the previous stage of the node N3. The communication status table 1100 indicates the amount of data received for the latest 30 minutes from each of the node group N1 and N2 at the previous stage.

The received amount of the node N3 from the node Ni is "20 [MB]". The received amount of the node N3 from the node N2 is "10 [MB]". In this case, for example, the node N3 calculates a dependency ratio of each of the nodes N1 and N2 at the previous stage from the ratio of the received amount of each of the node group N1 and N2 at the previous stage.

The dependency ratio of the node N1 at the previous stage is "2/3". The dependency ratio of the node N2 at the previous stage is "1/3". It is assumed that the currently used resource amount of the node N3 is "50[%]", and the currently unused resource amount of the node N3 is "50[%]". For the node N3, the increase condition in a case where the number of nodes at the previous stage is 2 or more is set to "estimated amount of resource to be used exceeds 80[%]".

First, it is assumed that the resource of the node N1 among the node group N1 and N2 at the previous stage is increased. In this case, the node N3 uses the above equation (1) to calculate the estimated resource consumption of the node N3 from the dependency ratio of the node N1 at the previous stage and the currently used resource amount and unused resource amount of the node N3. The estimated resource consumption is as follows.

Estimated resource consumption=50+50*(2/3)=83.3 [%]

Because the calculated estimated resource consumption exceeds 80[%], the node N3 determines that the resource of the node N3 is to be increased in conjunction with the node N1 at the previous stage.

A case where the resource of the node N2 among the node group N1 and N2 at the previous stage has been increased is assumed. In this case, the node N3 uses the above equation (1) to calculate the estimated resource consumption of the node N3 from the dependency ratio of the node N2 at the previous stage and the currently used resource amount and unused resource amount of the node N3. The estimated resource consumption is as follows.

Estimated resource consumption=50+50*(1/3)=66.6 [%]

Because the calculated estimated resource consumption is equal to or less than 80[%], the node N3 determines that the resource of the node N3 is not to be increased in conjunction with the node N2 at the previous stage.

(Example of Operation of Data Processing System 200)

An example of an operation of the data processing system 200 will be described with reference to FIG. 12. A case where the data processing system 200 has a multi-stage configuration and a multi-path configuration will be described.

Figure 12:
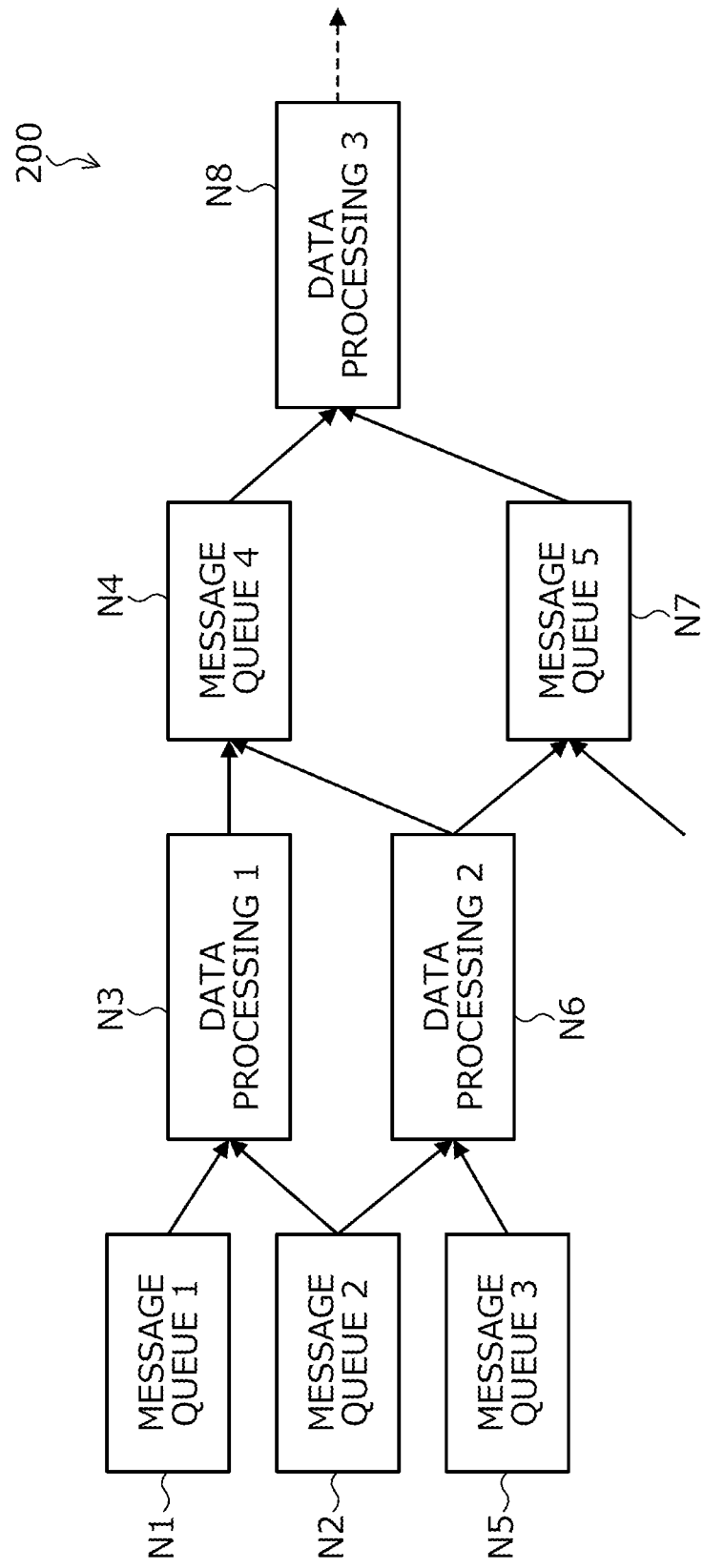
FIG. 12 is an explanatory diagram illustrating an example of an operation of the data processing system.

FIG. 12 is an explanatory diagram illustrating an example of an operation of the data processing system 200. As illustrated in FIG. 12, the data processing system 200 includes nodes N1 to N8. The node N1 executes a service in a message queue 1. The node N2 executes a service in a message queue 2. The node N3 executes a service of data processing 1.

The node N4 executes a service in a message queue 4. The node N5 executes a service in a message queue 3. The node N6 executes a service of data processing 2. The node N7 executes a service in a message queue 5. The node N8 executes a service of data processing 3.

The nodes N1 and N2 are a node group at the previous stage of the node N3. In response to reception of the increase notification from either of the node group N1 and N2 at the previous stage, the node N3 calculates a dependency ratio of each of the nodes N1 and N2 at the previous stage from the ratio of the received amount of each of the node group N1 and N2 at the previous stage. Next, the node N3 calculates estimated resource consumption from the dependency ratio of an enhanced node and the currently used resource amount and unused resource amount of the node N3. The enhanced node is a node that has received an increase notification. In a case where the estimated resource consumption satisfies the increase condition, the node N3 determines that the resource of the node N3 is to be increased.

The nodes N2 and N5 are a node group at the previous stage of the node N6. In response to reception of the increase notification from either of the node group N2 and N5 at the previous stage, the node N6 calculates a dependency ratio of each of the nodes N2 and N5 at the previous stage from the ratio of the received amount of each of the node group N2 and N5 at the previous stage. Next, the node N6 calculates estimated resource consumption of the node N6 from the dependency ratio of an enhanced node and the currently used resource amount and unused resource amount of the node N6. In a case where the estimated resource consumption satisfies the increase condition, the node N6 determines that the resource of the node N6 is to be increased.

The nodes N3 and N6 are a node group at the previous stage of the node N4. In response to reception of the increase notification from either of the node group N3 and N6 at the previous stage, the node N4 calculates a dependency ratio of each of the nodes N3 and N6 at the previous stage from the ratio of the received amount of each of the node group N3 and N6 at the previous stage. Next, the node N4 calculates estimated resource consumption of the node N4 from the dependency ratio of an enhanced node and the currently used resource amount and unused resource amount of the node N4. In a case where the estimated resource consumption satisfies the increase condition, the node N4 determines that the resource of the node N4 is to be increased.

As described above, each node Ni in the data processing system 200 may propagate the need for resource increase to the nodes at the subsequent stage by determining the necessity of resource increase on the node Ni at the timing at which the resource of the node Nj at the previous stage is increased.

(Example of Determination Processing of Increasing Resource Using Machine Learning)

Next, an example of processing in a case of determining whether or not to increase the resource of the node Ni by using regression analysis or machine learning using a neural network will be described with reference to FIG. 13.

Figure 13:
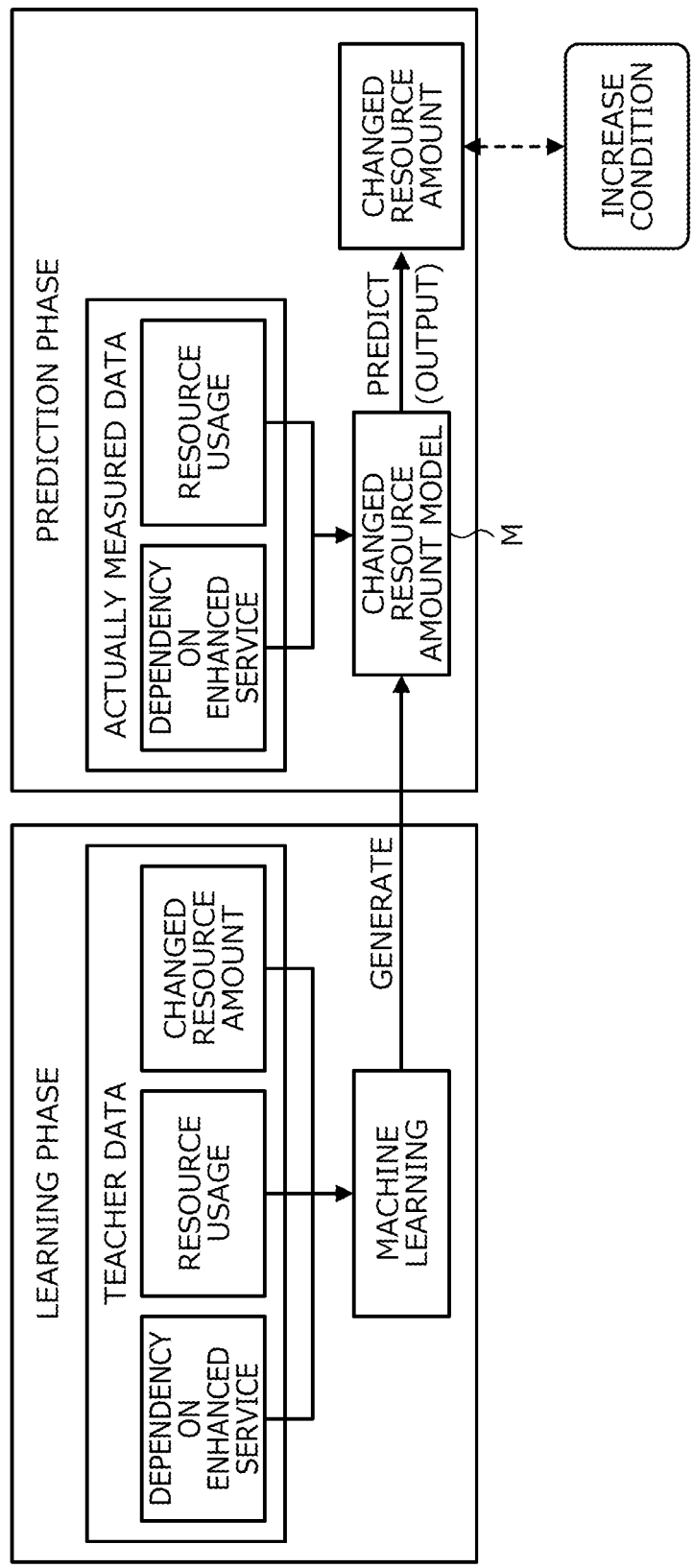
FIG. 13 is an explanatory diagram illustrating an example of processing of determining whether to increase the resource when using machine learning.

FIG. 13 is an explanatory diagram illustrating an example of determination processing of increasing the resource using machine learning. In a learning phase, the determination unit 604 acquires the dependency ratio of the node Nj at the previous stage and the resource usage of the node Nj at a first time point at which the resource of the node Nj at the previous stage is increased. The dependency ratio of the node Nj at the previous stage corresponds to the ratio of the received amount of the node Nj at the previous stage to the total of the received amount (for example, the received amounts for the latest 30 minutes at the first time point) of each of the node group at the previous stage of the node Ni.

The determination unit 604 acquires the resource usage of the node Ni at a second time point after the first time point. For example, the second time point is a time point after several minutes to several tens of minutes have elapsed from the first time point. The determination unit 604 performs machine learning by using the acquired dependency ratio of the node Nj at the previous stage at the first time point, the resource usage of the node Ni, and the resource usage of the node Ni at the second time point as teacher data to generate a changed resource amount model M.

The changed resource amount model M is a predictive model that outputs future resource usage by using, as inputs, the dependency ratio of the node Nj at the previous stage when the resource of the node Nj at the previous stage is increased and the resource usage of the node Ni.

In FIG. 13, the dependency ratio of the node Nj at the previous stage is referred to as "dependency on enhanced service", the resource usage of the node Ni is referred to as "resource usage", and the future resource usage of the node Ni is referred to as "changed resource amount".

In a prediction phase, by using the generated changed resource amount model M, the determination unit 604 determines whether or not to increase the resource of the node Ni based on the calculated dependency ratio of the node Nj at the previous stage and the resource usage (current) of the node Ni. The calculated dependency ratio of the node Nj at the previous stage is a dependency ratio calculated by the calculation unit 603 in accordance with the increase notification from the node Nj at the previous stage.

For example, the determination unit 604 calculates an estimated resource consumption by inputting the dependency ratio of the node Nj at the previous stage and the resource usage (current) of the node Nj to the changed resource amount model M. The dependency ratio of the node Nj at the previous stage and the resource usage (current) of the node Ni correspond to an actually measured data in FIG. 13. Thereafter, the determination unit 604 determines whether or not the calculated estimated resource consumption satisfies the increase condition.

For example, the determination unit 604 refers to the increase condition table 220 to identify the increase condition "estimated amount of resource to be used exceeds 80[%]" in a case where the number of nodes at the previous stage is 2 or more. The determination unit 604 determines whether or not the calculated estimated resource consumption is larger than 80[%]. In a case where the estimated resource consumption is larger than 80[%], the determination unit 604 determines that the resource of the node Ni is to be increased. By contrast, in a case where the estimated resource consumption is equal to or less than 80[%], the determination unit 604 determines that the resource of the node Ni is not to be increased.

Accordingly, it is possible to predict future resource usage based on a change in actual resource usage when the node Nj at the previous stage is enhanced, and it is possible to improve the prediction accuracy of the estimated resource consumption when the node Nj at the previous stage is enhanced.

For example, every time the resource of the node Nj at the previous stage is increased, the changed resource amount model M may be sequentially updated based on the dependency ratio of the node Nj at the previous stage when the resource is increased in the past, the resource usage, and the resource usage after a certain time elapses from the increase. In the node Ni, when determining whether or not to increase the resource of the node Ni, for example, the first few times when the resource of the node Nj at the previous stage is increased may be determined by using the above equation (1), and thereafter, may be determined by using the changed resource amount model M.

(Procedure of Increase Control Processing of Node Ni)

A procedure of increase control processing of the node Ni will be described with reference to FIG. 14.

Figure 14:
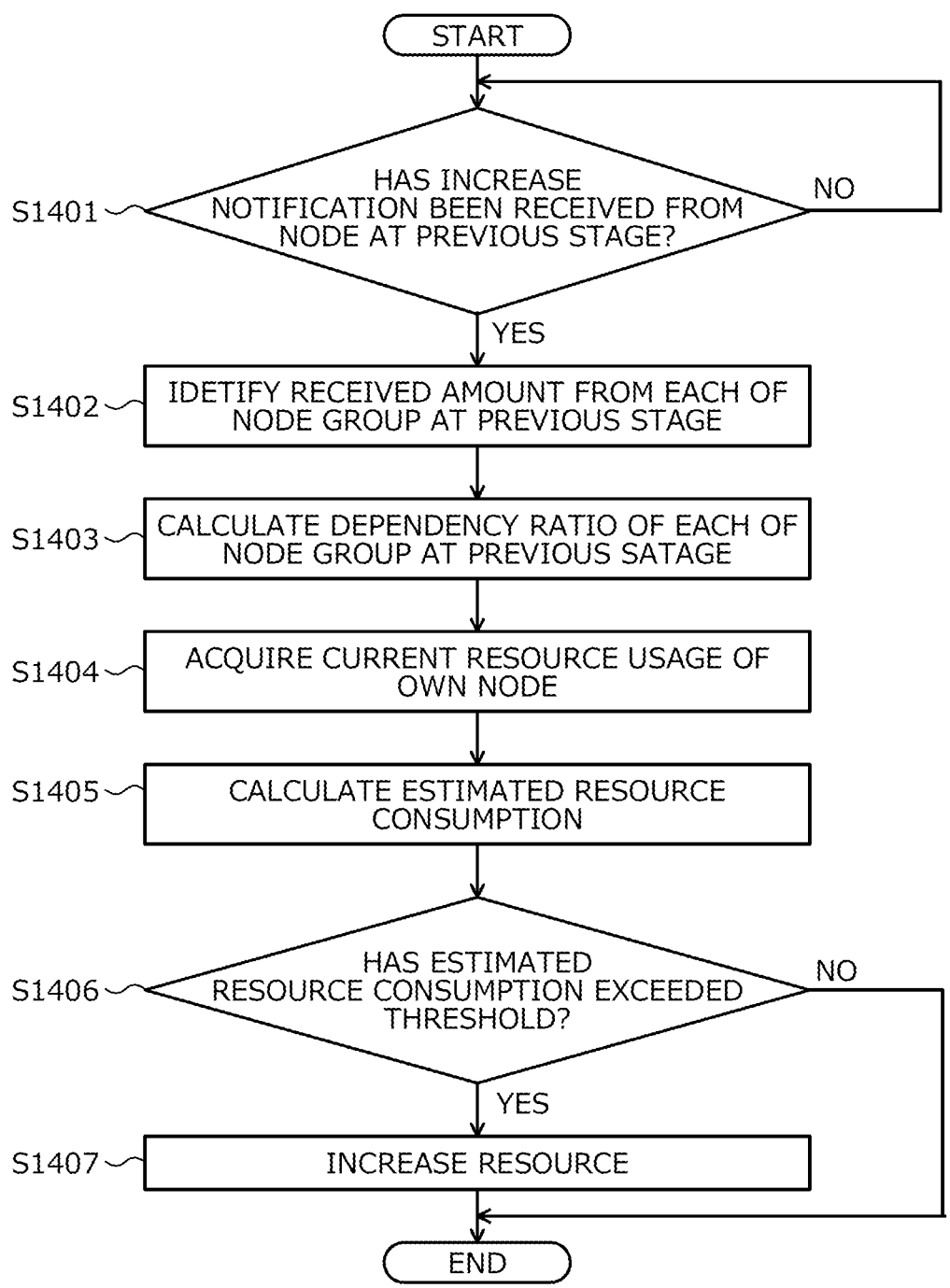
FIG. 14 is a flowchart illustrating an example of a procedure of increase control processing of increasing the node.

FIG. 14 is a flowchart illustrating an example of a procedure of increase control processing of the node Ni. As illustrated in FIG. 14, the node Ni determines whether or not an increase notification has been received from the node Nj at the previous stage of the node Ni among the nodes N1 to Nn (step S1401). The node Ni waits for reception of an increase notification from the node Nj at the previous stage (step S1401: No).

In a case where the node Ni receives an increase notification from the node Nj at the previous stage (step S1401: Yes), the node Ni identifies the amount of data received within the predetermined period T from each of the node group at the previous stages of the node Ni (step S1402). Hereinafter, the node Nj at the previous stage may be referred to as an "enhanced node Nj".

Based on the amount of data received from each of the identified node group at the previous stage within the predetermined period T, the node Ni calculates a dependency ratio of each of the node group at the previous stage (step S1403). Thereafter, the node Ni acquires the current resource usage of the node Ni (step S1404).

Based on the calculated dependency ratio of the enhanced node Nj and the acquired current resource usage of the node Ni, the node Ni calculates estimated resource consumption of the node Ni (step S1405). Next, the node N I refers to the increase condition table 220 to determine whether or not the calculated estimated resource consumption exceeds a threshold (step S1406).

In a case where the estimated resource consumption is equal to or less than the threshold (step S1406: No), the node Ni ends a series of processes according to this flowchart. By contrast, in a case where the estimated resource consumption exceeds the threshold (step S1406: Yes), the node Ni increases the resource of the node Ni (step S1407) and ends a series of processes according to this flowchart.

Accordingly, in a case where the node Ni predicts that the resource increase at the previous stage causes the resource shortage of the node Ni based on the dependency ratio of the enhanced node Nj, the node Ni may increase the resource of the node Ni in conjunction with the resource increase at the previous stage.

As described above, according to the node Ni according to the embodiment, upon receiving an increase notification from the node Nj at the previous stage of the node Ni among the nodes N1 to Nn, it is possible to calculate a dependency ratio of the node Nj at the previous stage (enhanced node) based on the amount of data received from each of the node group at the previous stage within the predetermined period T. The dependency ratio of the node Nj at the previous stage is a ratio of the received amount of the node Nj at the previous stage to the total of the received amount of each of the node group at the previous stage. The predetermined period T is a period of a certain time including a time point at which an increase notification is received, for example, a period of the latest 30 minutes.

Accordingly, the node Ni may determine the degree of dependence on the node Nj at the previous stage based on the amount of the latest network communication between the nodes.

According to the node Ni, it is possible to determine whether or not to increase the resource of the node Ni based on the calculated dependency ratio of the node Nj and the resource usage of the node Ni.

Accordingly, the node Ni may estimate how the enhancement of the node Nj at the previous stage affects the node Ni based on the degree of dependence on the node Nj at the previous stage, and may determine whether or not to increase the resource of the node Ni in conjunction with the increase of the resource of the node Nj at the previous stage. For this reason, in the data processing system 200, each node Ni may determine an appropriate timing at which the node Ni increases the resource thereof.

According to the node Ni, it is possible to calculate estimated resource consumption (future use resource amount) of the node Ni based on the dependency ratio of the node Nj at the previous stage, and the currently used resource amount and unused resource amount of the node Ni to determine that the resource of the node Ni is to be increased in a case where the calculated estimated resource consumption exceeds the threshold.

Accordingly, the node Ni may estimate estimated resource consumption (future use resource amount) based on the dependency ratio of the node Nj at the previous stage on the assumption that the unused resource of the node Ni will be used.

According to the node Ni, it is possible to acquire the dependency ratio of the node Nj at the previous stage and the resource usage of the node Ni at the first time point at which the resource of the node Nj at the previous stage is increased, and the resource usage of the node Ni at the second time point after the first time point. According to the node Ni, it is possible to generate the changed resource amount model M by performing machine learning using, as teacher data, the acquired dependency ratio of the node Nj at the previous stage at the first time point, the resource usage of the node Ni, and the resource usage of the node Ni at the second time point. The changed resource amount model M is a predictive model that outputs future resource usage by using, as inputs, the dependency ratio of the node Nj at the previous stage when the resource of the node Nj at the previous stage is increased and the resource usage of the node Ni.

Accordingly, it is possible to generate a model for predicting future resource usage based on a change in actual resource usage when the node Nj at the previous stage is enhanced in the past, and it is possible to improve the prediction accuracy of estimated resource consumption when the node Nj at the previous stage is enhanced.

According to the node Ni, by using the generated changed resource amount model M, it is possible to determine whether or not to increase the resource of the node Ni based on the dependency ratio of the node Nj at the previous stage, which is calculated in a case where an increase notification is received from the node Nj at the previous stage, and the resource usage (current) of the node Ni.

Accordingly, it is possible to accurately estimate a future use resource amount of the node Ni when the node Nj at the previous stage is enhanced.

According to the node Ni, the amount of data received may be represented in byte size or the number of messages.

Accordingly, the node Ni may switch between the units of byte size and the number of messages in which the amount of data amount is handled, depending on the characteristics of the data transmitted and received between the nodes. For example, in a case where the amount of data exchanged in one time of transmission and reception between nodes is substantially fixed, by handling the amount of data by the number of messages, the value becomes more abstract than the byte size, and the node Ni may reduce the processing load of the node Ni. In a case where the amount of data exchanged in one time of transmission and reception between the nodes changes, the node Ni may accurately grasp the ratio of the received amount of each of the node group at the previous stage by handling the amount of data in byte size.

For these reasons, in the data processing system 200 according to the embodiment, in a digital twin service or the like including stream data processing, when the resource of the node Nj at the previous stage of the node Ni is increased, it is possible to predict a future resource shortage in the node Ni and increase the resource in advance. Accordingly, when a certain service is enhanced, it is possible to avoid a resource shortage caused by an increase in an inflow amount of data to a service at the subsequent stage, and to suppress degradation in quality of the service.

According to the data processing system 200, for example, as compared with the case where each service increases a resource based on only the currently used resource of the service as in Related Art 1, it is possible to shorten the period of a resource shortage state and to improve the convenience of users.

According to the data processing system 200, for example, as compared with the case where the resource of the entire services is collectively increased as in Related Art 2, excessive increase may be avoided, and the cost for system operation may be reduced.

According to the data processing system 200, for example, various parameters due to the cooperation between services may not be set in advance as in Related Art 3, and it is possible to reduce the load of a builder (for example, an administrator of the data processing system 200). Since it is possible to determine whether or not to increase a resource based on the amount of the latest network communication, it is possible to make a determination in accordance with a situation in which a resource shortage (the node Nj at the previous stage) occurs, and it is possible to reduce the operation cost of the operator.

The data processing method described in this embodiment may be realized by executing a program prepared in advance on a computer such as a personal computer or a workstation. The data processing program described according to the present embodiment is recorded on a computer-readable recording medium such as a hard disk, a flexible disk, the CD-ROM, the DVD, or the USB memory and is executed as a result of being read from the recording medium by a computer. Also, the data processing program may be distributed via a network such as the Internet.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a data processing program for causing a processing device, among a plurality of processing devices that are grouped in two or more serially coupled stages and execute predetermined processing on received data and outputs a result, to execute a process comprising:

calculating, in a case where a notification that a resource is increased is received from a first processing device at a previous stage, a ratio of an amount of data received from the first processing device to a total amount of data received from processing devices at the previous stage, based on an amount of data received from each of the processing devices at the previous stage within a predetermined period; and increasing a resource of the processing device based on the calculated ratio and resource usage of the processing device.

2. The non-transitory computer-readable recording medium according to claim 1, wherein the resource usage includes a currently used resource amount and a currently unused resource amount, and in the increasing, a future use resource amount of the processing device is calculated based on the ratio, the currently used resource amount, and the currently unused resource amount, and the resource of the processing device is determined to be increased in a case where the calculated future use resource amount exceeds a threshold.

3. The non-transitory computer-readable recording medium according to claim 1, wherein the process further comprises acquiring a ratio of the amount of data received from the first processing device to the total amount of data received by the processing device and resource usage of the processing device at a first time point when the resource of the first processing device is increased, and resource usage of the processing device at a second time point after the first time point; and performing machine learning using the acquired ratio and the resource usage of the processing device at the first time point and the resource usage of the processing device at the second time point as teacher data to generate a predictive model that outputs future resource usage by using, as inputs, a ratio of the amount of data received from the first processing device to the total amount of data received by the processing device and the resource usage of the processing device when the resource of the first processing device is increased, and wherein in the increasing, it is determined whether or not to increase the resource of the processing device based on the calculated ratio and the resource usage of the processing device by using the generated predictive model.

4. The non-transitory computer-readable recording medium according to claim 1, wherein the amount of data received is represented by a byte size or the number of messages.

5. The non-transitory computer-readable recording medium according to claim 1, wherein the predetermined period is a period of a certain time including a time point at which the notification is received.

6. A data processing method to be performed by a processing device, among a plurality of processing devices that are grouped in two or more serially coupled stages, each processing device executes predetermined processing on received data and outputs a result, the method comprising:

receiving a notification that a resource is increased from a first processing device at a previous stage, and calculating a ratio of an amount of data received from the first processing device to a total amount of data received from processing devices at the previous stage, based on an amount of data received from each of the processing devices at the previous stage within a predetermined period; and increasing a resource of the processing device based on the calculated ratio and resource usage of the processing device.

7. A data processing system comprising:

a plurality of processing devices that are grouped in two or more serially coupled stages, each processing device executes predetermined processing on received data and outputs a result, wherein a processing device among the plurality of processing devices is configured to execute a process comprising:

calculating, in a case where a notification that a resource is increased is received from a first processing device at a previous stage, a ratio of an amount of data received from the first processing device to a total amount of data received from processing devices at the previous stage, based on an amount of data received from each of the group of processing devices at the previous stage within a predetermined period; and increasing a resource of the processing device based on the calculated ratio and resource usage of the processing device.

* * * * *